United States Patent [19]

Ueda et al.

[11] Patent Number: 5,031,598

[45] Date of Patent: Jul. 16, 1991

[54] INTAKE SYSTEM FOR MULTI-CYLINDER ENGINE WITH SUPERCHARGER

[75] Inventors: Kazuhiko Ueda, Higashihiroshima; Hiroyuki Oda; Kazuhiko Hashimoto, both of Hiroshima, all of Japan

[73] Assignee: Mazda Motor Corporation, Hiroshima, Japan

[21] Appl. No.: 323,730

[22] Filed: Mar. 15, 1989

[30] Foreign Application Priority Data

| Mar. 15, 1988 | [JP] | Japan | 63-61144 |
| Oct. 7, 1988 | [JP] | Japan | 63-131989[U] |
| Oct. 7, 1988 | [JP] | Japan | 63-254466 |

[51] Int. Cl.⁵ ............................................. F02B 33/00
[52] U.S. Cl. .................................. 123/564; 123/559.3
[58] Field of Search .............................. 123/564, 559.3

[56] References Cited

U.S. PATENT DOCUMENTS

| 3,796,048 | 3/1974 | Annus | 60/605.1 |
| 4,589,396 | 5/1986 | Tokushima | 123/564 |

FOREIGN PATENT DOCUMENTS

| 142822 | 6/1987 | Japan | 123/564 |
| 143319 | 6/1988 | Japan | 123/564 |

*Primary Examiner*—Douglas Hart
*Attorney, Agent, or Firm*—Fleit, Jacobson, Cohn, Price, Holman & Stern

[57] ABSTRACT

A multi-cylinder internal combustion engine having a plurality of cylinders which do not fire one after another and intake ports for the cylinders. A mechanical supercharger is disposed in an intake passage. An intake resonance passage having no enlarged volume space or chambers, which consists of a resonance passage part and a collecting passage part directly communicating with the resonance passage part, is connected to an outlet port of an intercooler forming a pressure reflecting portion. The intake ports for the cylinders are separately communicated with the collecting passage part by way of a plurality of independent intake passages. A bypass passage is connected between the collecting passage part and the intake passage downstream the mechanical supercharger so as to form a circular passage running the mechanical supercharger, intercooler, intake resonance passage.

19 Claims, 12 Drawing Sheets

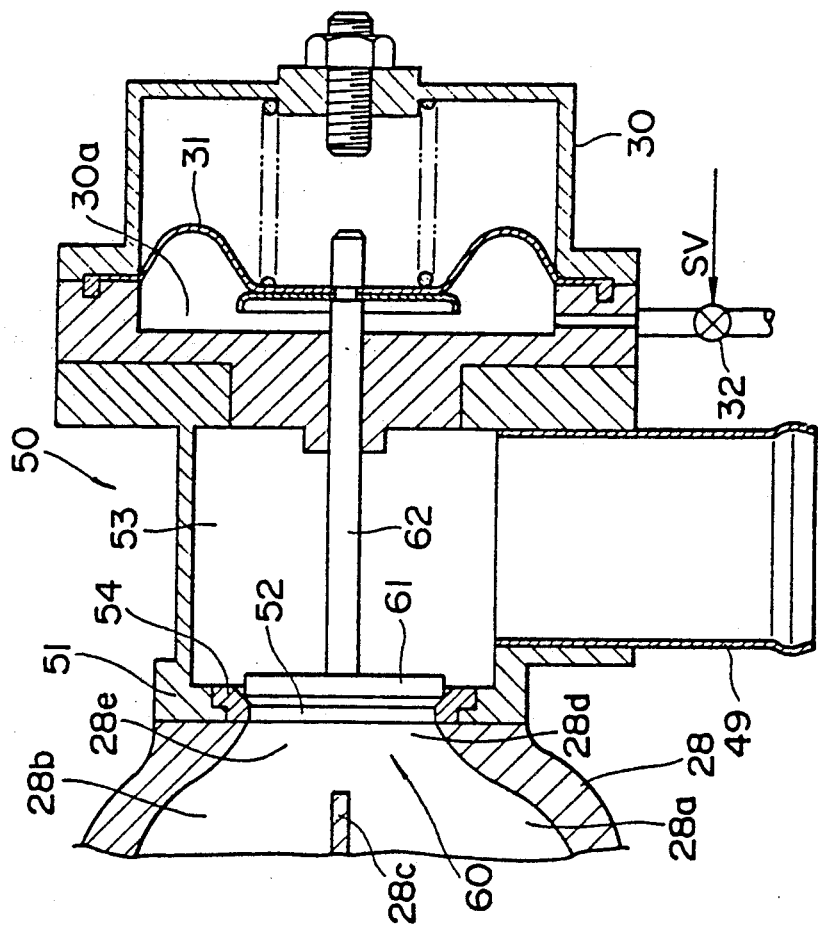
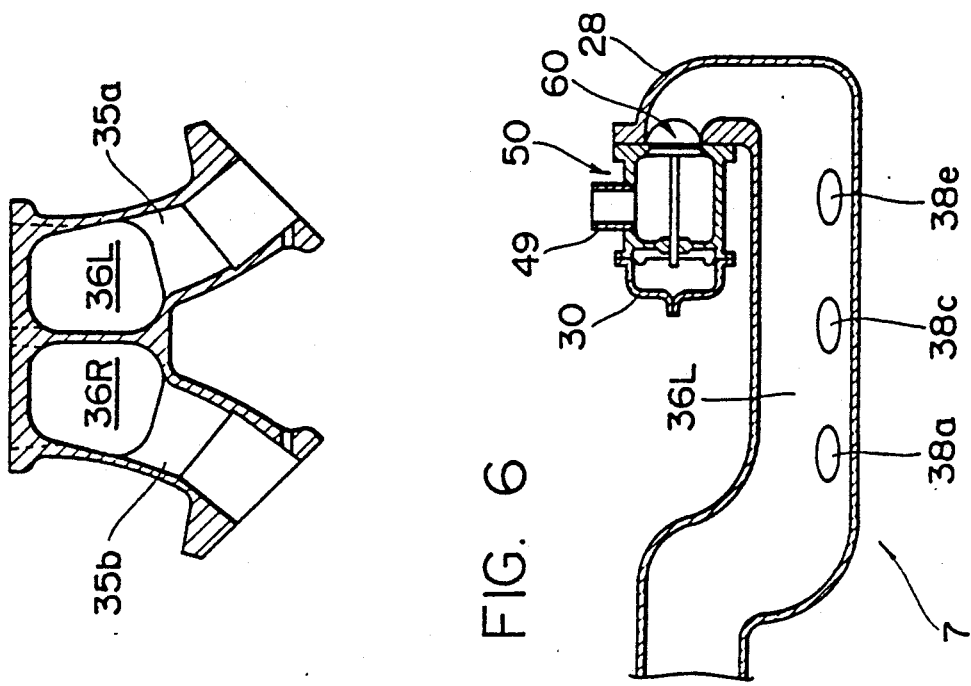

5,031,598

INTAKE SYSTEM FOR MULTI-CYLINDER ENGINE WITH SUPERCHARGER

FIELD OF THE INVENTION

The present invention relates to an intake system for a multi-cylinder internal combustion engine with a supercharger.

BACKGROUND OF THE INVENTION

An internal combustion engine with a supercharger has been developed with improved charging efficiency obtained by means of utilizing kinetic effects, such as inertia effects or resonance effects, of intake air. To obtain high volumetric efficiency over a wide range of engine speeds, it was taught that the natural frequency of resonance air column should be changed depending upon engine speed. One example of such internal combustion engines is disclosed in, for example, Japanese Patent Publication No. 60-14,169, consisting of cylinders divided into two groups, so that adjoining cylinders in each group do not fire one after the other. The cylinders in each group are separately communicated with an intake collecting passage by way of discrete intake passages. The intake collecting passages for the two groups of cylinders are communicated with each other by way of separate intake resonance passages having enlarged volume chambers, such as surge tanks, respectively. A switch means is disposed at the junction of the intake resonance passages for the two groups of cylinders for bringing the intake resonance passages into communication with each other in high engine speed range or interrupting communication therebetween in low engine speed range.

According to the internal combustion engine, the vibration of an air column in the intake resonance passage is generated by pressure waves due to periodic openings of the intake ports of the cylinders, generating the vibration of the air column in the intake collecting passage and the discrete intake passages. The resonance of vibration of the air column induces the greatest amplitude of pressure vibration, thereby greatly enhancing resonance effect of supercharging. The resonance effect supercharging is still more improved or enhanced by forming the intake resonance pipe with no enlarged volume chamber wherein pressure vibrations are attenuated. The provision of the intake resonance pipe having no enlarged volume chamber also contributes to an attempt at making the intake system, and hence the engine, compact.

In the above mentioned internal combustion engine, the more downstream a cylinder is located, the lesser the amount of intake air fed to the cylinder is with respect to an upstream located cylinder, whereby intake air is possibly unequally distributed and supplied among the cylinders. That is, when a cylinder is in its intake stroke in the state or condition that the intake air is less dense in the intake resonance pipe immediately after the intake of a cylinder located upstream the cylinder, the amount of intake air supplied to the downstream located cylinder tends to become less. The more the tendency is strengthened, the smaller the diameter of the intake resonance pipe becomes. However, in the case of supercharging intake air by way of utilizing kinetic effects, such as resonance effects, increasing the diameter of the intake resonance pipe results in a small amplitude of pressure vibration and weakened supercharging effect.

To obtain high engine output, it was thought that the intake system which charging air to the engine with utilizing resonance effects of intake air should be provided with a supercharger. If volumetric efficiency is not uniform among the cylinders, a cylinder having a volumetric efficiency higher than that of the other cylinders is apt to knock. In order to avoid knockings, it is required to decrease supercharging pressure, to retard firing timings or to change the compression ratio of intake air. This leads to an insufficient engine power output and an decrease of fuel efficiency.

SUMMARY OF THE INVENTION

The primary object of the present invention is to provide a multi-cylinder internal combustion engine having a supercharger disposed in an intake resonance pipe in which the supercharging efficiencies can be nearly equalized among cylinders.

The object of the present invention is achieved by an intake system for a multi-cylinder internal combustion engine having a plurality of cylinders which do not fire one after another and intake ports for the cylinders. A mechanical supercharger is disposed in an intake passage. An intake resonance passage having no enlarged volume space or chambers, which consists of a resonance passage and an intake collecting passage directly communicating with the resonance passage, is connected to an outlet port of an intercooler forming a pressure reflecting portion. The intake ports for the cylinders are separately communicated with the intake collecting passage by way of a plurality of independent intake passages. A bypass passage is connected to the intake collecting passage and the intake pipe downstream the mechanical supercharger. Intake air supercharged by the mechanical supercharger and cooled by the intercooler is supplied into the intake resonance passage from the upstream side to the downstream side thereof. A surplus of supercharged intake air in the intake resonance passage is returned to the mechanical supercharger and circulated.

BRIEF DESCRIPTION OF THE DRAWINGS

Still other aspects of the invention and more specific features will become apparent to those skilled in the art from the following description of the preferred embodiments considered together with the accompanying drawings, wherein like reference numbers have been employed in different figures to denote the same parts in structure and operation and in which:

FIG. 5 is a cross-sectional view of FIG. 3 taken along line V—V;

FIG. 6 is a longitudinal-sectional view of FIG. 3;

FIG. 7 is a cross-sectional view showing a relief valve means of the intake system of the V-6 internal combustion engine shown in FIG. 1;

DESCRIPTION OF THE PREFERRED EMBODIMENT

Figure 1:
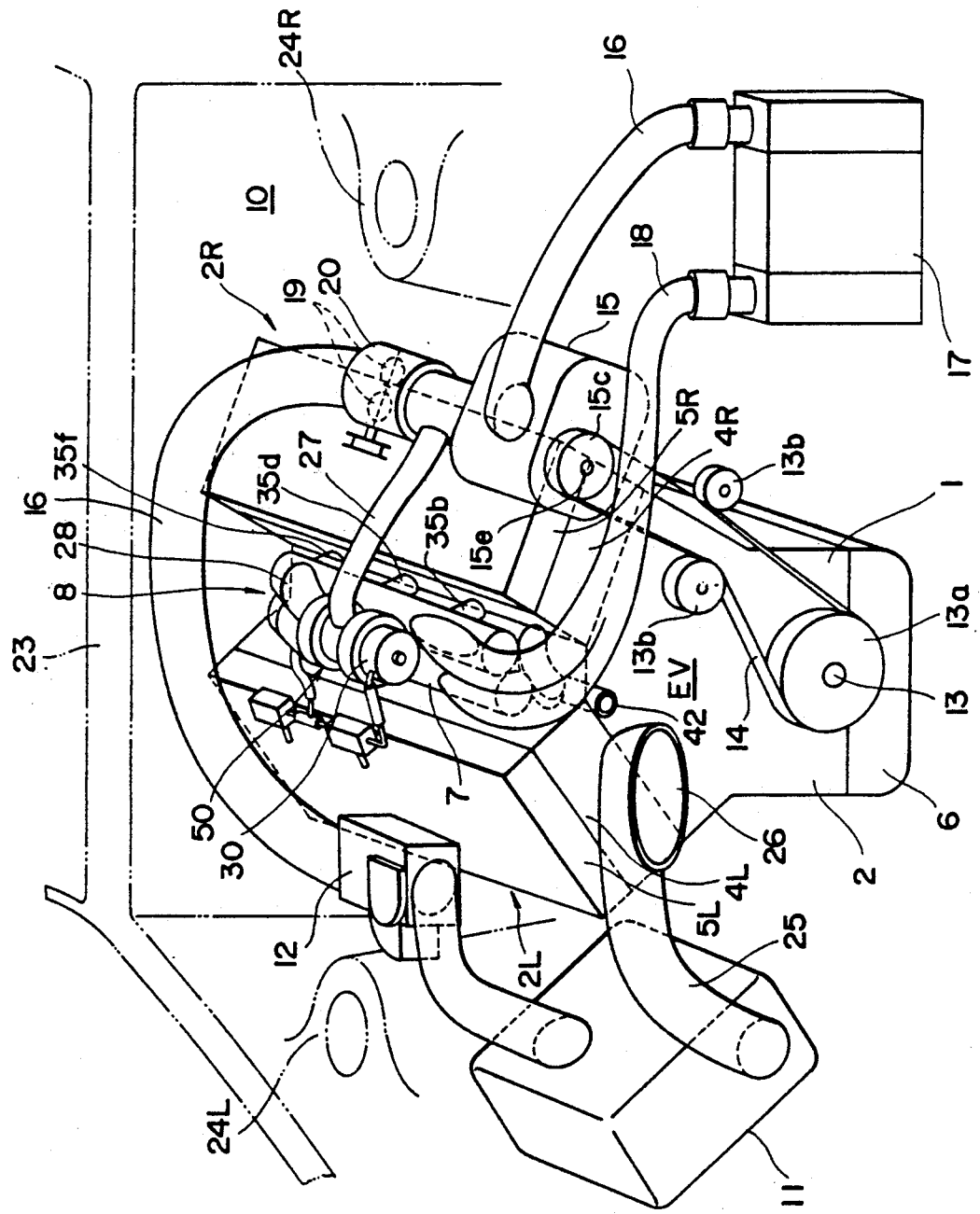
FIG. 1 is a perspective view showing a V-6 internal combustion engine with an intake system in accordance with a preferred embodiment of the present invention, which is put in an engine room.

An intake system in accordance with a preferred embodiment of the present invention is cooperated with a multi-cylinder internal combustion engine. Because such multi-cylinder internal combustion engines are well known, this description will be directed in particular to elements forming part of, or cooperating directly with, the intake system embodying the present invention. It is to be understood, however, that engine elements not specifically shown or described may take various forms known to those skilled in the art.

Referring to the drawings in detail, particularly to FIGS. 1 through 10, an engine body 1 of a V-6 engine EV, which is carried lengthwise in an engine room 10, having an intake system, with a supercharger in accordance with a preferred embodiment of the present invention, is shown, consisting of left and right cylinder banks 2L and 2R arranged in a V-formation with a predetermined relative angle, for example, a relative angle of 60 degrees.

The engine EV has a cylinder block 2 provided with cylinder bores (not shown) in which pistons can slide. A left cylinder head 4L is mounted on the block 2 and provides for the left cylinder bank 2L and a right cylinder head 4R is mounted on the block 2 and provides for the right cylinder bank 2R. Cylinder head covers 5L and 5R are provided to cover the upper portions of the left cylinder head 4L and the right cylinder head 4R, respectively. An oil pan 6 is provided to cover the bottom of a crankcase of the engine EV and to form a sump for engine oil for keeping dirt, etc., from entering the engine EV. An intake manifold 7 is disposed in a V-shaped space 8 defined between the left and right cylinder banks 2L and 2R.

An air cleaner 11 is provided on the left side of the engine EV and an air flow meter 12 is disposed above the left cylinder head cover 5L of the left cylinder bank 2L and connected to the air cleaner 11. A mechanical supercharger 15, which is a rotor type supercharger, is disposed on the right side of the engine EV in the engine room 10 and is connected, on one hand, to the air cleaner 11 by way of an upstream pipe part of the intake pipe 16 and, on the other hand, to a thin or flat air operated intercooler 17 which is of rectangular parallelpiped shape and is disposed apart from the engine EV in the engine room 10, by way of a downstream pipe part of an intake pipe 16. The intercooler 17 is communicated with the intake manifold 7 by means of a common intake pipe 18. The mechanical supercharger 15 consists of a hollow cylinder body 15a having two rotors (not shown) disposed therein, an electromagnetic on-off clutch means 15b, a pulley 15c and a drive shaft 15e. The pulley 15c is coaxially fixed on the end of the drive shaft 15e fixed to one of the rotors and projecting from the cylindrical body 15a. The longitudinal axis of the mechanical supercharger 15 is parallel to a crankshaft 13 of the engine EV. The pulley 15c is connected or coupled to a pulley 13a fixed on the end of the crankshaft 13 by a belt 14 to transmit the engine output to the mechanical supercharger 15. The on-off clutch means 15b are disposed on the drive shaft 15e between the pulley 15c and the cylindrical body 15a so that the engine output transmitted from the crankshaft 13 is connected to or disconnected from the rotors. Idlers 13b set the tension on the belt 14.

The intake pipe 16 is provided in the upstream pipe part thereof with a throttle body 20 having a throttle valve 19 disposed above the right cylinder bank 2R and behind the mechanical supercharger 15 and an air flow meter 12 disposed upstream the throttle valve 19 and apart laterally from the left cylinder bank 2L. The upstream pipe part of the intake pipe 16 is generally U-shaped and extends horizontally to surround the rear end of the engine body 1 passing through a space defined between the engine body 1 and a dash panel 23 forming a rear wall of the engine room 10.

The air flow meter 12 and throttle body 20 are located adjacent and laterally close to left and right suspension towers 24L and 24R and above the left and right cylinder head covers 5L and 5R, respectively, in the engine room 10. The air cleaner 11 is spaced apart laterally from the left cylinder bank 2L in front of the left suspension tower 24L, and the supercharger 15 and intercooler 17, which are relatively spaced apart in the lengthwise direction and laterally from each other, are spaced apart laterally from the right cylinder bank 2R in front of the right suspension tower 24R. The air cleaner 11 is provided with an air introducing pipe 25 extending inwardly in the engine room 10. The air introducing pipe 25 has an air intake 26 which is directed to the forward direction in which the vehicle moves, and is positioned in front of the engine body 1 so as to take ambient air into the air introducing pipe 25 when the vehicle is traveling.

A common bypass pipe 27, which extends across over the right cylinder head cover 5R toward the V-shaped space 8 defined between the left and right cylinder banks 2L and 2R, couples the upstream pipe part of the intake pipe 16 to the downstream ends of branch bypass pipes 28 of the intake manifold 7 to communicate them. A relief valve means 50, which is operated by a negative pressure operated actuator 30, is provided at the juncture of these common bypass pipe 27 and the branch bypass pipes 28.

The intake manifold 7 is provided at the downstream end thereof with a relief valve means 50 connected with a negative pressure-operated actuator 30 which will be described in detail later. To selectively introduce working negative pressure into the negative pressure-operated actuators 30, a three-way solenoid valve 32 is provided in association with the actuator 30.

The left cylinder bank 2L is formed therein with No. 1, No. 3 and No. 5 cylinders 2a, 2c and 2e, and the right cylinder bank 2R is formed therein with No. 2, No. 4 and No. 6 cylinders 2b, 2d and 2f. The No. 1 cylinder 2a, the No. 6 cylinder 2f, the No. 3 cylinder 2c, the No. 4 cylinder 2d, the No. 5 cylinder 2e, and the No. 2 cylinder 2b are fired in order. That is, the cylinders 2a to 2f are divided into two groups and the cylinders in each group are disposed in one and the same cylinder bank 2L or 2R, respectively, so that adjoining cylinders in each cylinder bank 2L or 2R do not fire one after another. The cylinder 2a to 2f are, respectively, provided with intake ports 3a to 3f whose openings extend toward the V-shaped space 8 between the cylinder banks 2L and 2R. Further, the cylinder 2a to 2f are, respectively, provided with exhaust ports (not shown) whose openings extend to the sides of the corresponding cylinder banks remote from the V-shaped space 8.

The cylinders 2a, 2c and 2e in the left cylinder bank 2L and the cylinders 2b, 2d and 2f in the right cylinder bank 2R are arranged in rows parallel to a crankshaft 13 of the engine EV, respectively. The row of the cylinders 2a, 2c and 2e in the left cylinder bank 2L is offset forward with respect to the vehicle in which it is mounted relative to the row of the cylinders 2b, 2d and 2f in the right cylinder bank 2R.

Figure 2:
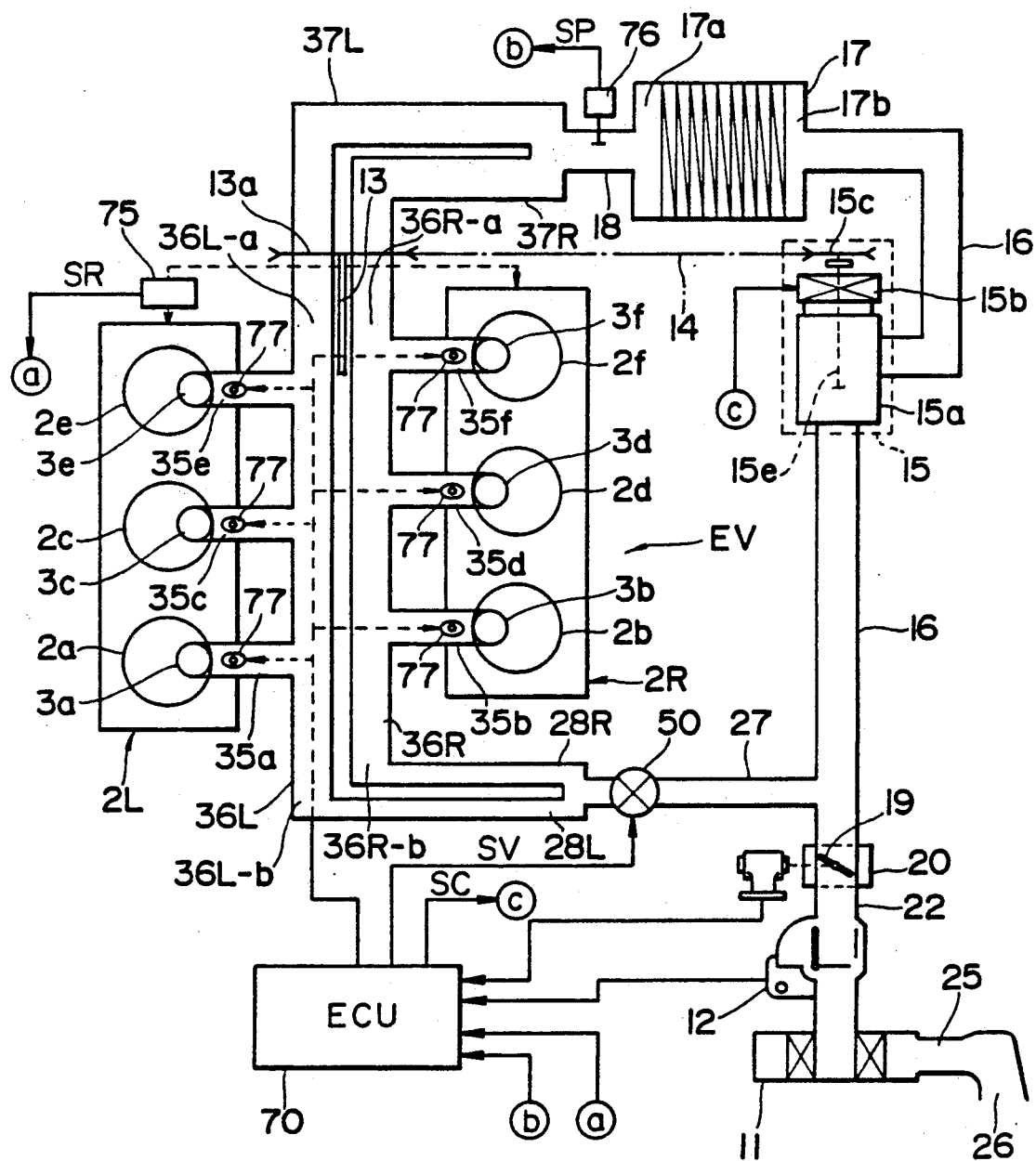
FIG. 2 is a schematic, diagrammatical view showing the V-6 internal combustion engine shown in FIG. 1.

Designated by numerals 75, 76 and 77 in FIG. 2 are, respectively, a distributor 75 as an engine speed sensor provided in connection with the No. 1 to No. 6 cylinders 2a to 2f, an air pressure sensor 76 disposed in the common resonance pipe 18 and fuel injection nozzle 77 provided for the respective cylinders 2a to 2f.

Figure 3:
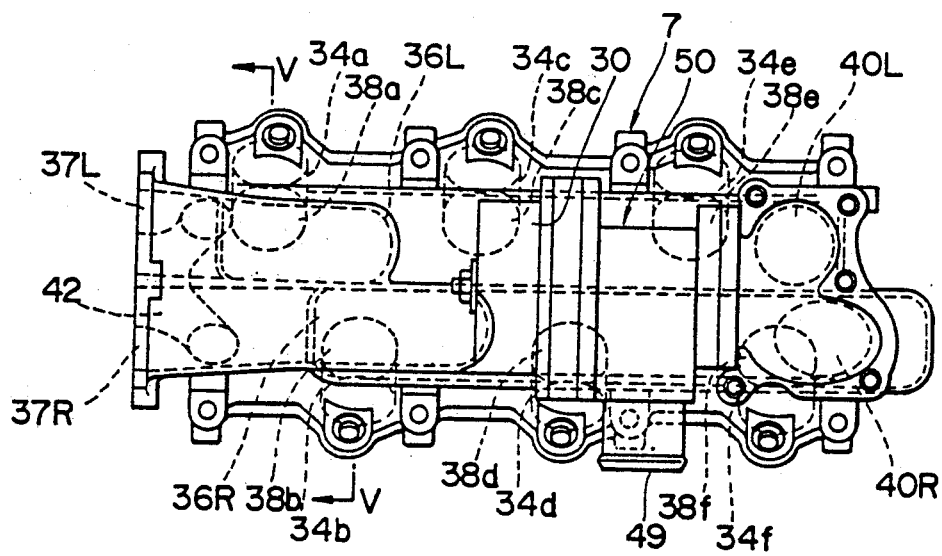
FIG. 3 is a plan view of an intake manifold of the V-6 internal combustion engine shown in FIG. 1.
Figure 4:
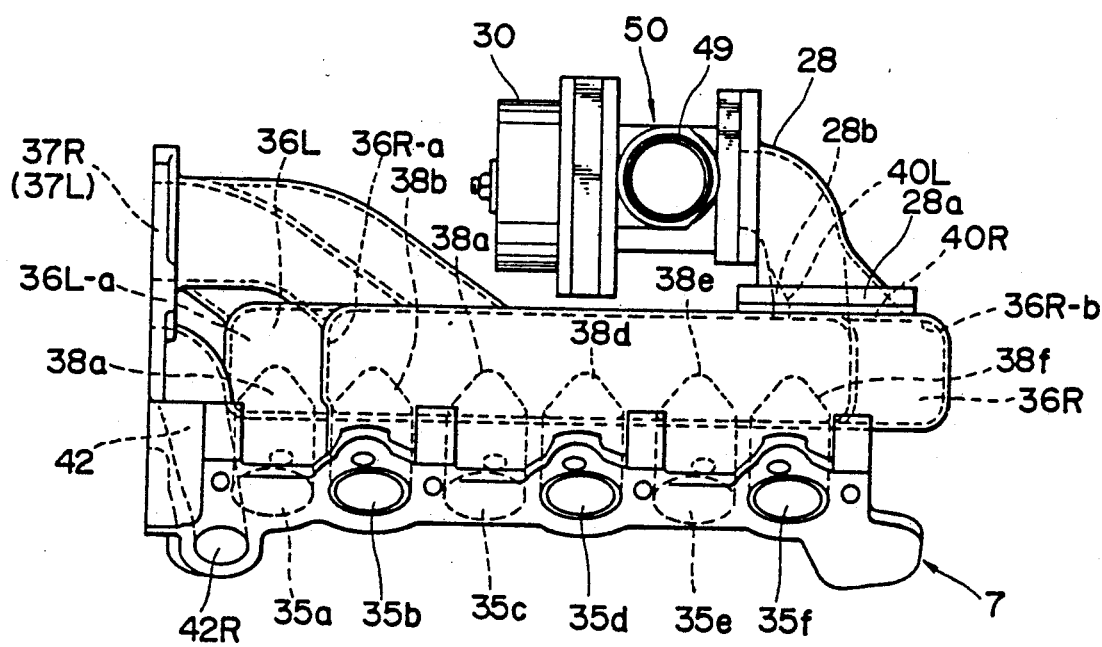
FIG. 4 is a side view of FIG. 3.

The intake manifold 7, as shown in detail in FIGS. 3 and 4, consists of left and right intake collecting pipes 36L and 36R, which define parts of intake resonance passages. The left and right intake collecting pipes 36L and 36R and the discrete intake pipes 35a to 35f are integrally formed by casting, and are so configured compact as not to have substantially enlarged spaces or volume chambers. The left intake collecting pipe 36L is formed with bottom openings 38a, 38c and 38e arranged at regular spacings in a row parallel to the crankshaft 13. The bottom openings 38a, 38c and 38e, respectively, communicate with the intake ports 3a, 3c and 3e for the cylinders 2a, 2c and 2e in the left cylinder bank 2L, separately, by way of discrete intake passages 34a, 34c and 34e defined by the discrete intake pipes 35a, 35c and 35e, which are relatively short in length. Similarly, the right intake collecting pipe 36R is formed with bottom openings 38b, 38d and 38f arranged at regular spacings in a row parallel to the crankshaft 13, and hence the row of bottom openings 38a, 38e and 38e. The bottom openings 38b, 38d and 38f communicate with the intake ports 3b, 3d and 3f for the cylinders 2b, 2d and 2f in the right cylinder bank 2R, separately, by way of discrete intake passages 34b, 34d and 34f defined by the discrete intake pipes 35b, 35d and 35f, which are relatively short in length. The left and right intake collecting pipes 36L and 36R are arranged side by side but offset with respect to each other in the direction parallel to the crankshaft 13 or the lengthwise direction of the intake manifold 7 correspondingly to the offset between the left and right cylinder banks 2L and 2R.

The intake manifold 7 has left and right branch intake resonance pipes 37L and 37R branching off from the common intake pipe 18 communicated with an outlet tank of the intercooler 17 forming a pressure reflecting portion 17a. These left and right branch intake resonance pipes 37L and 37R are located or positioned above and in front of the front end of the intake manifold 7, and are separately communicated with the upstream ends 36L-a and 36R-a of the left and right intake collecting pipes 36L and 36R, respectively. The left branch intake resonance pipe 37L extends horizontally and is sloped down backwardly, and opens to the inside of the left intake collecting pipe 36L at a position substantially right above the most upstream located or positioned bottom opening 38a. Similarly, the right branch intake resonance pipe 37R extends horizontally and is sloped down backwardly, and opens to the inside of the right intake collecting pipe 36R substantially right above the most downstream located or positioned bottom opening 38b. Due to such construction of each branch intake resonance pipe 37L or 37R, air flow is directed downwardly and spreads all over the bottom openings 38a, 38c and 38e of the left intake collecting pipe 36L or the bottom openings 38b, 38d and 38f of the right intake collecting pipe 36R.

The left and right intake collecting pipes 36L and 36R are formed with bypass openings 40L and 40R in top walls of the downstream ends 36L-b and 36R-b of the left and right intake collecting pipes 36L and 36R, respectively. The bypass openings 40L and 40R for the left and right intake collecting pipe 36L and 36F are, respectively, communicated with branch bypass pipes 28a and 28b which branch off from the downstream end of the bypass pipe 27. The bypass pipe 27 extends upwardly, and then it is bent forward above the intake manifold 7. The valve inlet 49 extends laterally outward and is connected to the common bypass pipe 27. The common bypass pipe 27 and branch bypass pipes 28a and 28b form a bypass passage for allowing the intake air to flow into the left and right intake collecting pipes 36L and 36R from the downstream ends, bypassing the supercharger 15.

The intake manifold 7 is formed, right below the left and right branch intake resonance pipes 37L and 37R, with a breech pipe 42 having an inlet connected to a radiator hose (not shown) from a radiator through which water enters into the left and right cylinder banks 2L and 2R. The intake manifold 7 is also formed with water passages 42L and 46R communicating with a water jacket (not shown) of the left and right cylinder banks 2L and 2R, respectively Referring to FIGS. 5 and 6, the relief valve means 50 is provided with a relief valve 60 cooperating with the pressure-operated actuator 30 to open and close. The branch bypass pipes 28a and 28b are formed by dividing a passage of a pipe 28 with a partition wall 28c, and are communicated at narrowed connecting ends 28d and 28e of the pipe 28 by way of the lack of the partition wall 28c. The pipe 28 is connected to a flange 51 of the relief valve means 50 enclosing a valve port 52 of the relief valve means 50, through the valve port 52 the branch bypass pipes 28a and 28b communicating with a valve chamber 53 of the relief valve means 50. A valve seat 54 is received in and mounted on the valve port 52 of the flange 51 of the relief valve means 50.

The relief valve 60 consists of a valve head 61 with a valve stem 62 slidably supported by a casing of the actuator 30 for movement in an axial direction parallel to the crank shaft 13. The valve head 61 is connected to a diaphragm 31 of the actuator 30 by way of the valve stem 62. The relief valve 60 is designed to open when pressure is introduced into an air chamber 30a of the actuator 30. The actuator 30 is provided with a three-way valve 32 which is controlled by an electric control unit (EPC) 70 (which will be described in detail later) to open so as to introduce pressure into the air chamber 30a. That is, the three-way valve 32 opens when the pressure of the downstream side of the supercharger 15 is higher than a predetermined upper critical pressure P1 (for example approximately 450 mmHg) or the electromagnetic on-off clutch means 19a is off to relieve pressure or the engine load is low, namely, intake air pressure is lower than a predetermined lower critical pressure P2 (for example approximately—100 mmHg), to allow intake air to flow therethrough bypassing the supercharger 15. The relief valve 60 prevents over-supercharging in high engine load range or decreases a loss of air pump efficiency in low engine load range.

Figure 8:
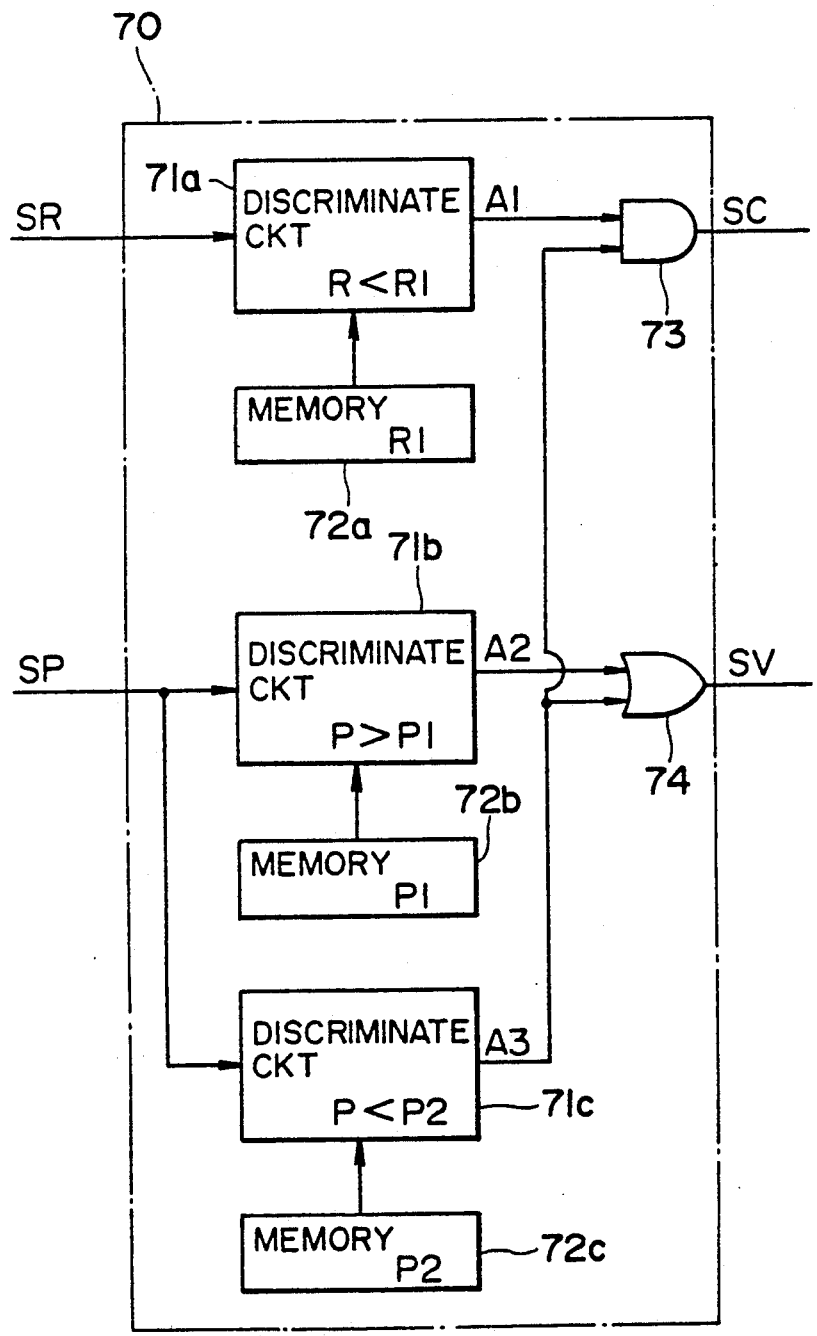
FIG. 8 is a block diagram showing an electric control unit shown in FIG. 2.

An electronic control unit (ECU) 70, shown in detail in FIG. 8, controls the intake system depicted in FIG. 2, along with the fuel injection nozzles 77 for the cylinders 2a through 2f and the supercharger 15. The ECU 70 consists of first, second and third sets of signal discriminate circuits 71a, 71b and 71c and memories 72a, 72b and 72c, AND gate 73 and OR gate 74. The first signal discriminate circuit 71a receives an engine speed signal SR representing an operating engine speed R in r.p.m from the distributor 75 and compares it with a predetermined or selected critical engine speed R1 stored in the first memory 72a. The critical engine speed R1 is set to, for example in this embodiment, 3000 r.p.m. When the operating engine speed R is higher than the critical engine speed R1, the first signal discriminate circuit 71a provides AND gate 73 with an actuating signal A1. The second signal discriminate circuit 71b receives an air pressure signal SP representing the pressure P of the intake air in the common intake resonance pipe 18 in mmHg from the air pressure sensor 76 and compares it with the predetermined or preselected upper critical pressure P1 (450 mmHg) stored in the second memory 72b. When the intake air pressure P is more higher than the upper critical pressure P1, the second signal discriminate circuit 71b provides OR gate 74 with an actuating signal A2. Similarly, the third signal discriminate circuit 71c receives the air pressure signal SP from the air pressure sensor 76 and compares it with the lower critical pressure P2 (−100 mmHg) stored in the third memory 72c. When the intake air pressure P is more lower than the lower critical pressure P2, the third signal discriminate circuit 71c provides both AND and OR gates 73 and 74 with an actuating signal A3.

When AND gate 73 simultaneously receives actuating signals A1 and A3 from the first and third signal discriminate circuits 71a and 73c, it provides the electromagnetic on-off clutch means 15b of the mechanical supercharger 15 with a clutch control signal SC. At the presence of the clutch control signal SC, the electromagnetic on-off clutch means 15b turns off. Otherwise, when AND gate 73 receives no actuating signals A1 and A3 or either one of the actuating signals A1 and A3, from the first and third signal discriminate circuits 71a and 73c, it does not provide the electromagnetic on-off clutch means 15b of the mechanical supercharger 15 with any clutch control signal SC. At the absence of the clutch control signal SC, the electromagnetic on-off clutch means 15b is maintained turned on.

When OR gate 74 receives an actuating signal A2 or A3 from either one of the second and third signal discriminate circuits 71b and 71c, it provides the electric operated three-way valve 32 of the actuator 30 with a valve control signal SV. The three-way valve 32, at the presence of the valve control signal SV, introduces air into the air chamber 30a of the air-operated actuator 30 so as axially to move the relief valve 61, thereby opening the valve port 52.

Figure 9:
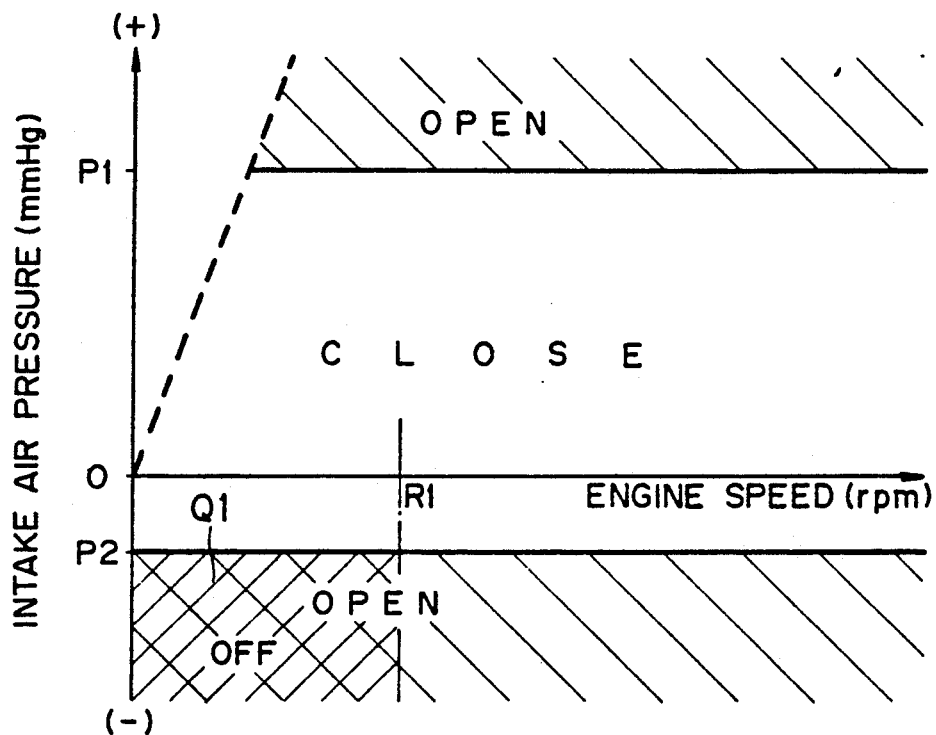
FIG. 9 is a graph showing the relationship between engine speed and intake air pressure for the engine shown in FIG. 2.
Figure 10:
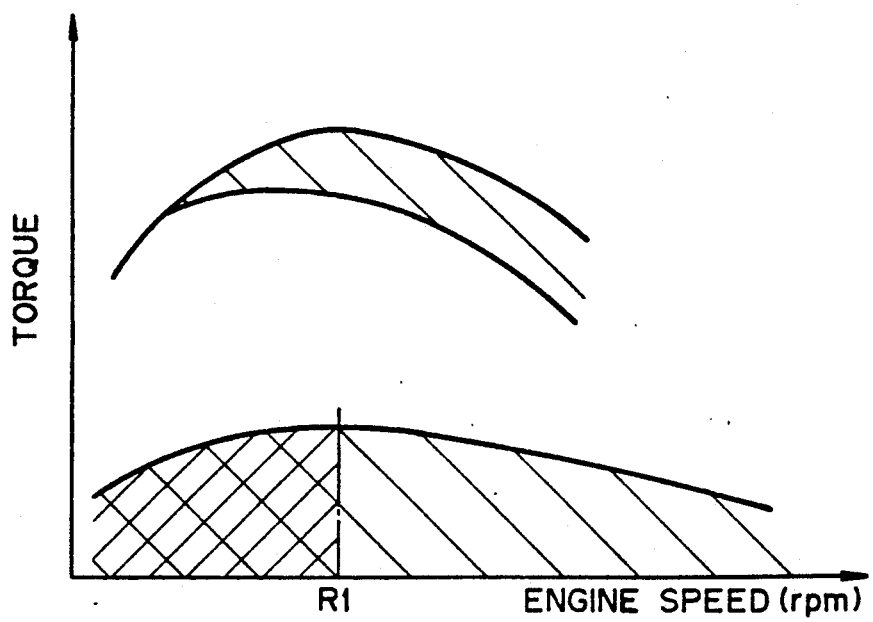
FIG. 10 is a graph showing the relationship between engine speed and engine power output for the engine shown in FIG. 2.

The operation of the intake system depicted in FIGS. 1 through 8 is controlled by way of the ECU 70 and is best understood by referring to FIGS. 9 and 10. An engine speed signal SR is input into the ECU 70 from the distributor 75, and is discriminated by the first discriminate circuit 71a of the ECU 70 whether the operating engine speed R is higher than the critical engine speed R1. Simultaneously, an air pressure signal SP is input into the ECU 70 from the air pressure sensor 76, and is discriminated by the second and third discriminate circuits 71b and 71c whether the intake air pressure P is higher the upper critical pressure P1 or lower than the lower critical pressure P2. The ECU 70 outputs a clutch control signal SC to the on-off clutch means 15b of the mechanical supercharger 15 and a valve control signal SV to the three-way valve 32 of the actuator 30 mechanically coupled to the relief valve means 50 when the engine E is operated in low engine speed, low engine load range Q1 shown in FIG. 9. That is, when the engine speed is lower than the critical engine speed R1 (R1=3000 r.p.m.) and the intake air pressure P is lower than the lower critical pressure P2 (P2=−100 mmHg), the on-off clutch means 15b turns off to disconnect the engine output transmitted from the crankshaft 13 from the rotors of the mechanical supercharger 15, and the relief valve means 50 opens.

In the low engine speed, low engine load range, the mechanical supercharger 15, although stops, discharges and supplies intake air into the left and right intake collecting pipes 36L and 36R, through the intercooler 17, the common intake pipe 18 and the branch intake resonance pipes 37L and 37R, to some extent. This is due to a pressure difference of intake air in the intake pipes 16 caused between the upstream and downstream sides of the mechanical supercharger 15. At this time, the relief valve means 50 opens effectively to communicate the common bypass pipe 27 with the left and right branch bypass pipes 28L and 28R, whereby the intake air can be equally distributed and supplied among the left and right intake collecting pipes 36L and 36R from the left and right branch bypass pipes 28L and 28R, respectively. Therefore, each of the cylinder 2a-2f can receive a sufficient amount of intake air, and volumetric efficiencies is equalized among the cylinders 2a-2f, accordingly. This leads to the improvement of fuel economy and emission set loss and the decrease of engine noises and engine vibrations. At any time when the operating engine speed R becomes higher than the critical engine speed R1 or when the intake air pressure P becomes higher than the lower critical pressure P2, the on-off clutch means 15b turns on.

In high engine load, or high intake air pressure, range, higher than the upper critical pressure P1, substantially over the whole range of operating engine speeds R, where the ECU 70 outputs a valve control signal SV to the three-way valve 32 of the actuator 30 mechanically coupled to the relief valve means 50, the mechanical supercharger 15 discharges and supplies a great amount of intake air into the left and right intake collecting pipes 36L and 36R from the left and right branch intake resonance pipes, respectively, and a surplus of the intake air supplied into the left or right intake collecting pipes 36L and 36R is returned into upstream pipe part of the intake pipe 16 passing through the branch bypass pipes 28L and 28R connected to the downstream ends 36L-a and 36R-a of the left and right intake collecting pipes 36L and 36R, the relief valve means 50, and the common bypass pipe 27. When the relief valve means 50 opens, a circular passage running through the intake passage 16, the supercharger 15, the intercooler 17, the branch intake resonance passage 37L and 37R and the intake collecting pipes 36L and 36R is formed. Therefore, the intake air can be partly circulated through the intake system. The circulating of intake air through the left and right intake collecting pipes 36L and 36R allows the downstream located cylinders, in particular the No. 1 and No. 2 cylinders 2a and 2b, to be supplied with a sufficient amount of intake air, and thereby equalizes volumetric efficiencies among the No. 1 through No. 6 cylinders 2a-2f so as to prevent the engine E from knocking.

In intermediate engine load range between the upper and lower critical pressures P1 and P2 where the ECU 70 does not output any signal and the relief valve means 50 is closed, the mechanical supercharger 15 effectively operates, increasing the pressure of intake air acting to the intake ports 3a to 3f for the respective cylinders 2a to 2f. Thereby, intake air can be supplied to each cylinder 2a to 2f with an increased volumetric efficiency.

In such intermediate and high engine load ranges, pressure vibrations which consist of negative pressures produced in the course of the intake strokes of the respective cylinders 2a, 2c and 2e or 2b, 2d and 2f and positive pressures produced at the end of the intake strokes are generated in the manner of sine curve in the intake ports 3a, 3c and 3e or 3b, 3d and 3f corresponding to the cylinders 2a, 2c and 2e or 2b, 2d and 2f which are not fired one after another. For example, the pressure waves generated in the intake ports 3a, 3c and 3e for the respective cylinders 2a, 2b and 2e are propagated toward the outlet tank or pressure reflecting portion 17a of the intercooler 17, along the intake collecting pipe 36L and the branch intake resonance pipe 37L. The pressure waves are propagated in the branch intake resonance pipe 37L and reflected by way of the pressure reflecting portion 17a of the intercooler 17; and act to the intake ports 3a, 3c and 3e for the cylinders 2a, 2c and 2e, respectively. In such a manner, intake air can be supplied to each cylinder 2a-2f with a more improved volumetric efficiency in the manner of resonance supercharging effects. The intake collecting pipes 36L and 36R can, because of no enlarged volume spaces or chambers, reduce diminishing of the pressure waves propagating therethrough; and highly improve the supercharging efficiencies in the respective cylinders. By virtue of the communication of the intake collecting pipes 36L and 36R by way of the branch bypass pipes 28a and 28b, tuning points for the respective cylinders can be on a high speed side in comparison with intake collecting pipes without being communicated with each other; and the intake air in the downstream parts of the left and right intake collecting pipes 36L and 36R where the intake flow resistance of intake air is generally high can flow between the intake collecting pipes 36L and 36R so as thereby to apply the intake air to the downstream located intake ports 3a and 3b with increased volumetric efficiencies. Therefore, the volumetric efficiencies can be equalized among the cylinders 2a to 2f.

Figure 11:
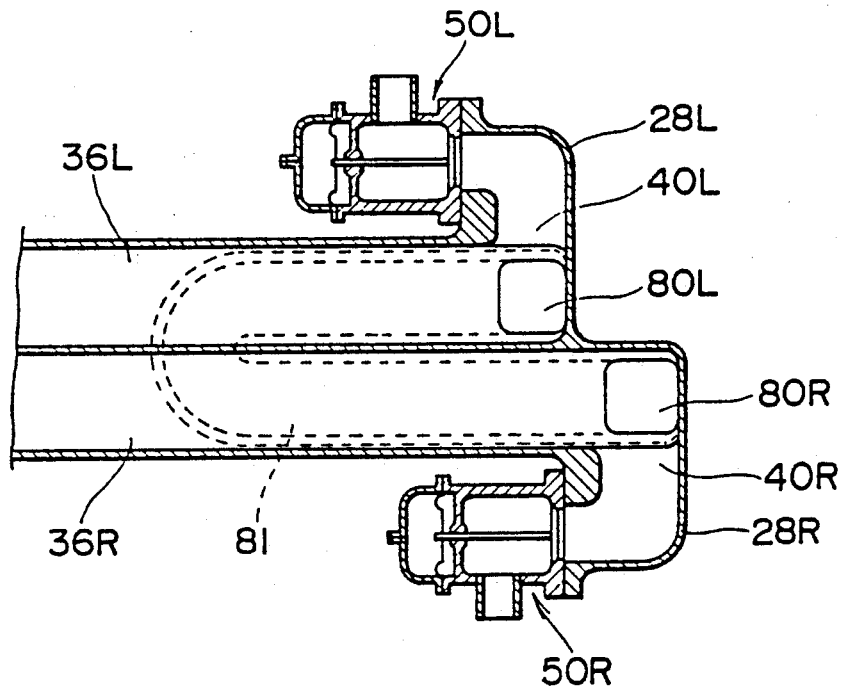
FIG. 11 is a longitudinal-sectional view showing a variant of the intake manifold shown in FIGS. 3 and 4.

The intake system described above can be modified as shown in FIG. 11. In this modified form, the intake collecting pipes 36L and 36R are connected with the branch bypass pipes with relief valve means 50L and 50R disposed therein, respectively. As shown, the left intake collecting pipe 36L is connected with the branch bypass pipe 28L by way of a bypass opening 40L formed at the downstream part 36L-b of the left intake collecting pipe 36L. A relief valve means 50L, which is identical in structure and operation to the relief valve means 50 of the above described embodiment, is disposed in the branch bypass pipe 28L. Similarly, the right intake collecting pipe 36R is connected with the branch bypass pipe 28R by way of a bypass opening 40R formed at the downstream part 36R-b of the right intake collecting pipe 36R. A relief valve means 50R, which is identical in structure and operation to the relief valve means 50L, and hence the relief valve means 50, is disposed in the branch bypass pipe 28R. The left and right relief valve means 50L and 50R are connected to the common bypass pipe 27.

The left and right intake collecting pipes 36L and 36R are formed at the downstream ends with bottom openings 80L and 80R, respectively. A generally U-shaped interconnecting pipe 81, which is relatively long in effective length, is disposed under the intake manifold 7 in the V-shaped space 8 between the left and right cylinder banks 2L and 2R and extends from the downstream part toward the upstream part of the left and right intake collecting pipes 36L and 36R. The bottom openings 80L and 80R of the respective intake collecting pipes 36L and 36R are connected by means of the interconnecting pipe 81 to to communicate the left and right intake collecting pipes 36L and 36R. The interconnecting pipe 81 reduces the frequency of natural vibration of intake air in the left and right intake collecting pipes 36L and 36R so as to contribute to or enhance the supercharging effect in the low engine speed range.

Figure 12:
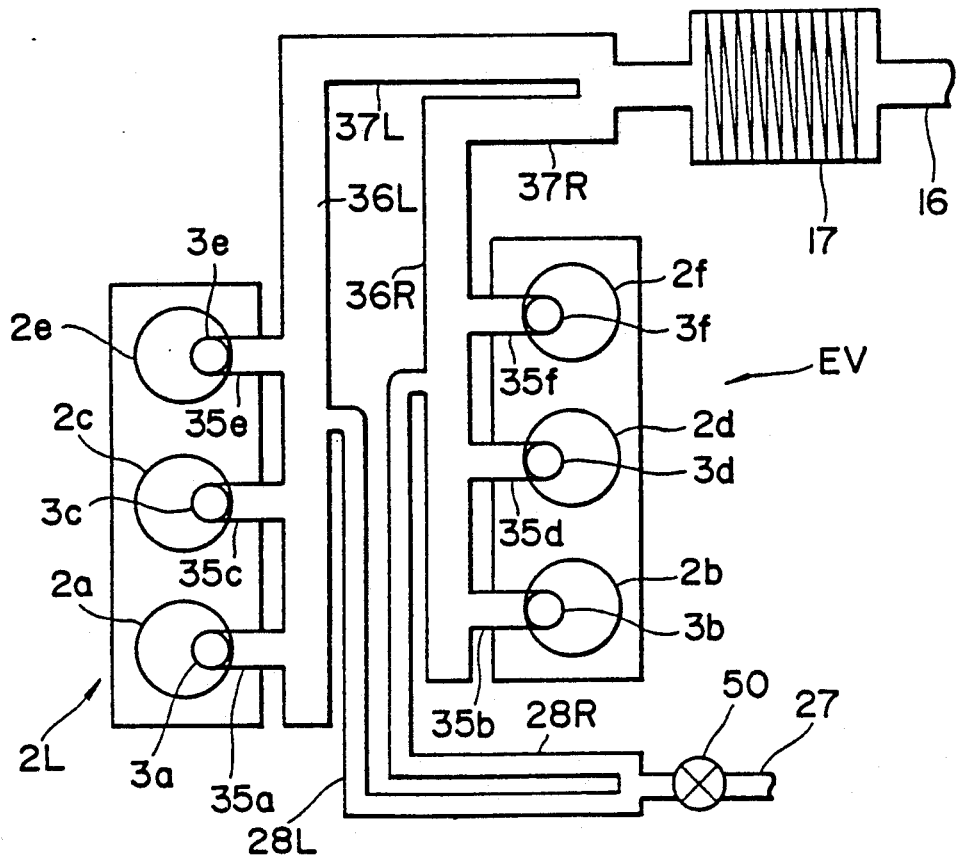
FIG. 12 is a schematic diagrammatical view showing a variant of the V-6 internal combustion engine shown in FIG. 1.

Referring to FIG. 12 showing a preferable variant of the internal combusion engine shown in FIG. 2, the intake system according to the present invention has a modified intake pipe arrangement. In FIG. 12, all of elements not shown therein are identical to those of the internal combustion engine EV shown in FIG. 2. As shown, the branch bypass pipes 28a or 28b are connected to the the left and right intake collecting pipes 36L and 36R at positions between upstream and downstream located cylinders between, for example, the No. 3 and No. 5 cylinders 2c and 2e and the No. 4 and No. 6 cylinders 2d and 2f, respectively. Otherwise, the branch bypass pipes 28a or 28b can be connected to the left and right intake collecting pipes 36L and 36R at positions between the No. 1 and No. 3 cylinders 2a and 2c and the No. 4 and No. 6 cylinders 2b and 2d, respectively. That is, each branch bypass pipes 28a or 28b can be connected to the intake collecting pipe 36L or 36R at any position downstream the most upstream located cylinder 2e or 2f, respectively.

Referring now to FIGS. 13 to 16 showing an intake system according to another preferred embodiment of the present invention, which is attempted to attain an improved resonance effects overall a wide range of engine speeds by changing the frequency of natural vibration of intake air in the intake collecting pipes. The basic structure of the intake system is substantially identical to that of the previous embodiment excepting the addition of a pressure reflecting passage with a first switch valve and an intake collecting pipe extension with second switch valves. That is, the left intake collecting pipe 36L is connected at the upstream part 36L-a to the branch intake resonance pipe 37L which is communicated with the pressure reflecting portion 17a of the intercooler 17. Similarly, the right intake collecting pipe 36R is connected at the upstream part 36R-a to the branch intake resonance pipe 37R which is communicated with the pressure reflecting portion 17a of the intercooler 17. The left and right branch intake resonance pipes 37L and 37R communicate with each other by way of a communication passage 81 forming a pressure reflecting passage provided downstream the pressure reflecting portion 17a of the intercooler 17. A first switch valve 82, which is actuated by means of an electric operated actuator 83, is disposed in the pressure reflecting passage 81.

Figure 14:
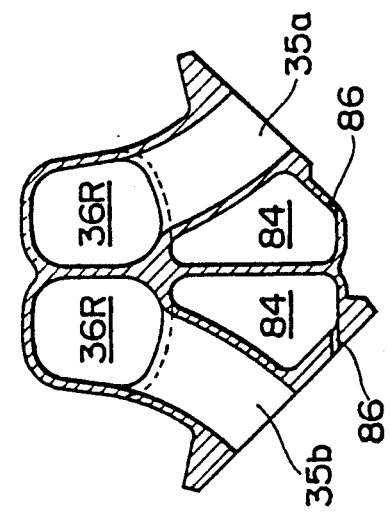
FIG. 14 is a cross-sectional view of FIG. 13.
Figure 15:
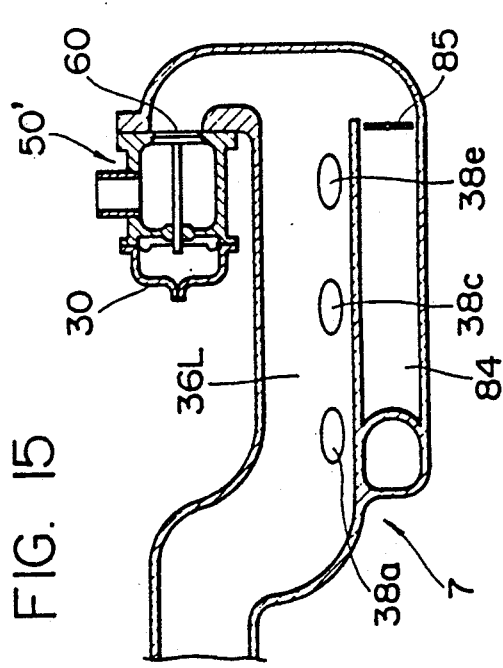
FIG. 15 is a longitudinal-sectional view showing another variant of the intake manifold shown in FIGS. 3 and 4, in which branch intake resonance passage are communicated with each other.

The downstream ends 36L-b and 36R-b of the left and right intake collecting pipes 36L and 36R are communicated with each other by way of an intake collecting pipe extension 84. As shown in FIG. 14, the intake collecting pipe extension 84 is practically laid under the left and right intake collecting pipes 36L and 36R. The left and right intake collecting pipes 36L and 36R, the discrete intake pipes 35a to 35f and the intake collecting pipe extension 84 form the intake manifold 7 and are integrally formed as one whole by casting and configured compact. Designated by a reference numeral 86 in FIG. 14 is a passage provided in the bottom wall of the intake collecting pipe extension 84 to form a drain port for keeping water and oil from remaining in the the intake collecting pipe extension 84.

Two second switch valves 85, which are identical in structure to each other and cooperatively actuated by means of an electric controlled actuator 86, are disposed in the intake collecting pipe extension 84 close to the downstream ends 36L-b and 36R-b of the left and right intake collecting pipes 36L and 36R, respectively. The branch bypass pipes 28L and 28R are connected to the left and right intake collecting pipes 36L and 36R between the respective second switch valves 85L and 85R and the downstream ends 36L-b and 36R-b of the left and right intake collecting pipes 36L and 36R, respectively.

Figure 16:
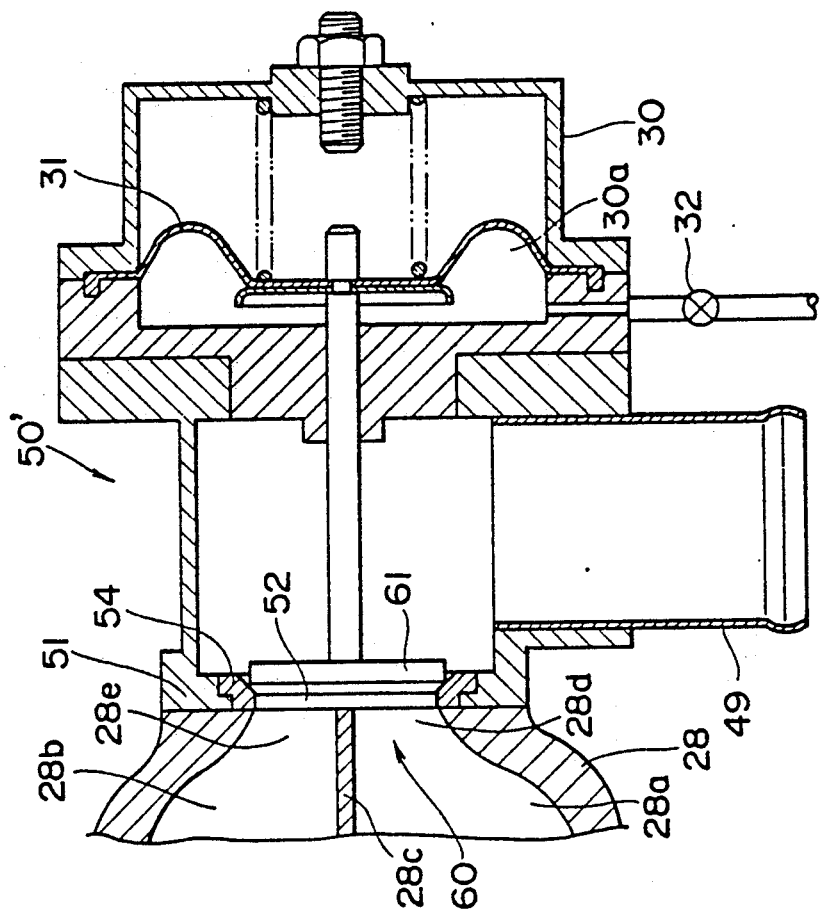
FIG. 16 is a cross-sectional view showing a relief valve means of the intake manifold shown in FIG. 15.

A relief valve means 50', which is also actuated with the negative pressure operated actuator 30, is disposed close to the downstream ends of the left and right branch bypass pipes 28L and 28R. As shown in FIG. 16, the relief valve means 50' is similar or substantially identical in structure and operation to the relief valve means 50 of the previously described embodiment shown in FIG. 7, excepting that the branch passages 28a and 28b are completely separated with the partition wall 28c extending to the end of the pipe 28.

All of the first and second switch valves 82 and 85 are controlled by the ECU 70 to open or close independently but in a same way. That is, when the engine EV operates in low engine speed range I, the first and second switch valves 82 85 are all closed. In intermediate engine speed range II the first switch valve 82 is opened but the second switch valves 85 are closed. Otherwise, in high engine speed range III the first and second switch valves 82 and 85 are all opened. In this embodiment, the relief valve means 50' is controlled by the ECU 70 to open in low engine speed, low engine load range or in high engine load range.

In the low engine speed range I where the first and second switch valves 82 and 85 are closed, the left and right intake collecting pipes 36L and 36R are independently communicated with the first pressure reflection portion 17a of the intercooler 17 by way of the left and right branch intake resonance pipes 37L and 37R, respectively, whereby a relatively long resonance air column is formed so as to contribute or enhance the supercharging effect in the low engine speed range.

In the intermediate engine speed range II where the first switch valve 82 is opened and the second left and right switch valves 85 are closed, the left and right branch intake resonance pipes 37L and 37R are communicated with each other by way of the pressure reflecting passage 81, whereby a relatively short resonance air column is formed in the intermediate engine speed range.

In the high engine speed range III where the first and second switch valves 82 and 85 are all opened, the left and right intake collecting pipes 36L and 36R are effectively communicated at the downstream ends 36L-b and 36R-b thereof by way of the intake collecting pipe extension 84 in addition to that the left and right branch intake resonance pipes 37L and 37R are communicated with each other by way of the pressure reflecting passage 81, increasing the volume of pressure waves to effectively propagate.

Figure 17:
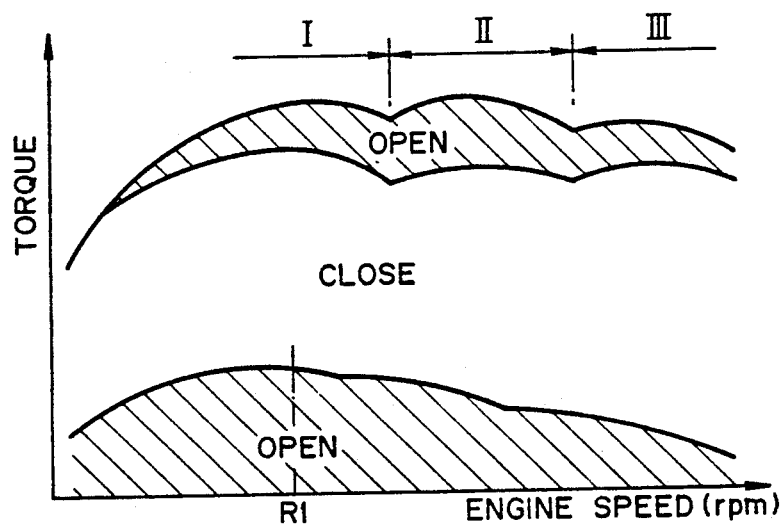
FIG. 17 is a graph showing the relationship between engine speed and engine power output for the engine shown in FIG. 15.

In this embodiment, the frequency of vibration of intake air can be changed according to engine speeds by forming a resonance air column depending in length upon the range of engine operating speed so as to improve resonance effect supercharging in the whole engine speed range as shown in FIG. 17.

Figure 18:
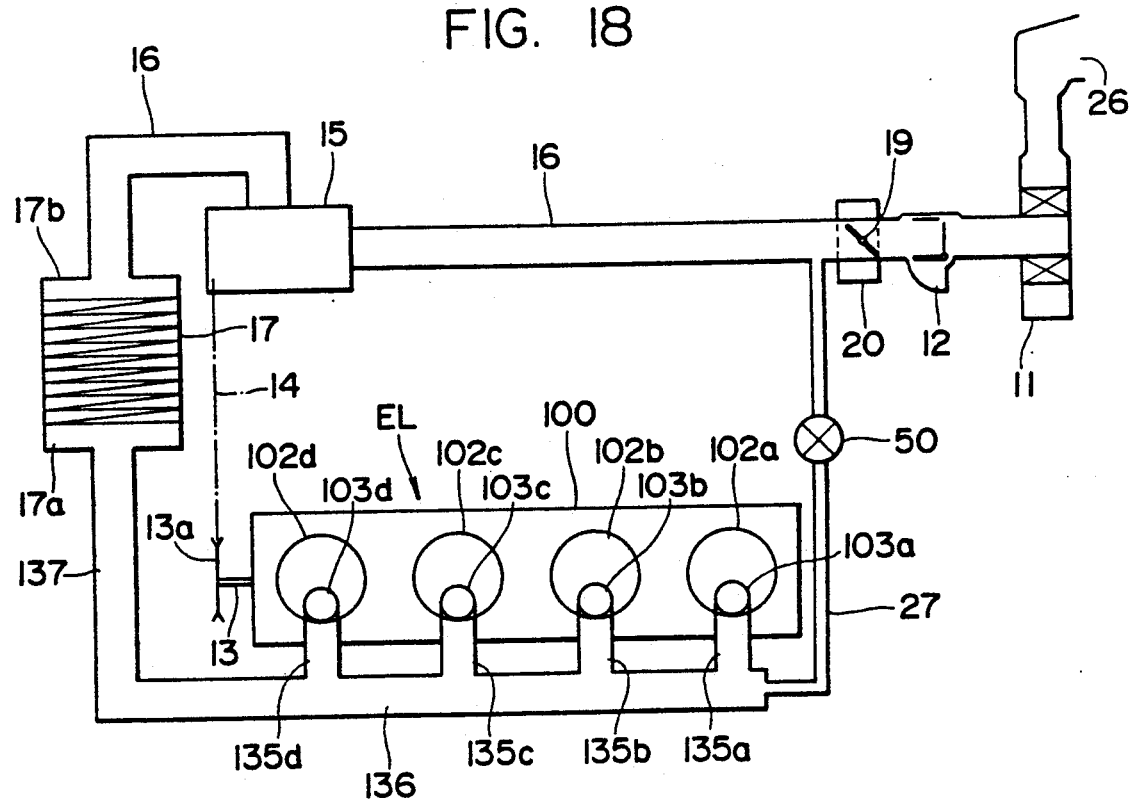
FIG. 18 is a schematic, diagrammatical view showing an in-line four cylinder internal combustion engine with an intake system in accordance with a preferred embodiment of the present invention.

The intake system of the present invention can be embodied in various in-line multi-cylinder engines as well as in V-type multi-cylinder engines. Referring to FIG. 18, an engine body 100 of an in-line four cylinder engine EL having an intake system in accordance with a preferred embodiment of the present invention is shown, being formed with No. 1, No. 2, No. 3 and No. 4 cylinders 102a, 102b, 103c and 102d arranged one after the other in numerical order in a straight line parallel to a crank shaft 113. The engine body 100 is in a vertical or near vertical position. The cylinders 102a to 102d are, respectively, provided with intake ports 103a to 103d. Further, the cylinder 102a to 102d are, respectively, provided with exhaust ports (not shown).

Intake air is introduced into the cylinders 102a to 102d through an intake pipe 16 comprising upstream and downstream pipe parts, a intake resonance pipe 137 and an intake collecting pipe 136 extending from the downstream end of the intake resonance pipe 137.

The intake ports 103a to 103d for the cylinders 102a to 102d of the engine EL are separately communicated with the intake collecting pipe 136 by way of discrete intake pipes 135a to 135d which are relatively short in length. The intake collecting pipe 136 is provided with an upstream extension pipe 137 extending from the upstream end.

Figure 13:
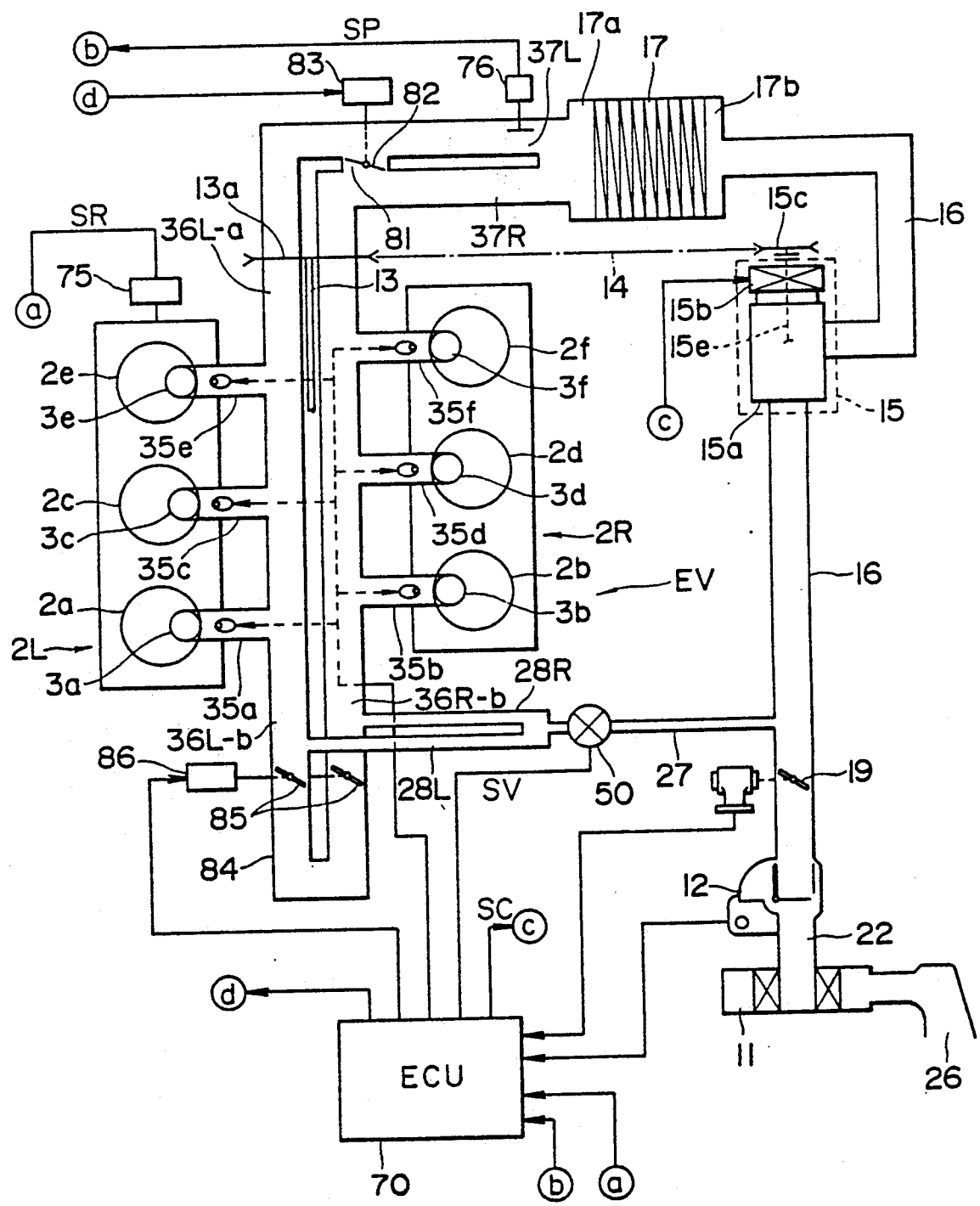
FIG. 13 is a schematic, diagrammatical view showing the V-6 internal combustion engine with an intake system in accordance with another preferred embodiment of the present invention.

The intake pipe 16 is, from the upstream end, provided with an air cleaner 11, air flow meter 12 and throttle valve 19 in the upstream pipe part, and a mechanical supercharger 15 disposed between the upstream and downstream pipe parts thereof. The mechanical supercharger 15, shown in block, is identical in structure and operation to that used in the intake system of the previous embodiment shown in FIG. 2 or 13. That is, when the engine speed is lower than a critical engine speed (for example 3000 r.p.m.) and the intake air pressure of the downstream side of the supercharger 15 is lower than a lower critical pressure (for example approximately −100 mmHg), the engine output transmitted from the crankshaft to the rotors of the mechanical supercharger 15 is disconnected. An air operated intercooler 17, which is identical in structure and operation to that used in the previous embodiment shown in FIG. 2 or 13, is connected at the inlet tank 17b to the downstream end of the downstream pipe part of the intake pipe 16 and at the outlet tank 17a forming a pressure reflecting portion to the upstream end of the intake resonance pipe 137.

The downstream end of the intake collecting pipe 136 is communicated with the middle portion of the upstream pipe part of the intake pipe 16 by way of a bypass pipe 27. A relief valve means 50 with an air operated actuator 30, which is identical to that shown in FIG. 7, is provided at the middle portion of the bypass pipe 27. That is, when the engine EL operates in low engine load range where the intake air pressure on the downstream side of the supercharger 15 is lower than a lower critical pressure P1 (for example approximately −100 mmHg) or in high engine load range where the intake air pressure of the downstream side of the supercharger 15 is higher than an upper critical pressure P2 (for example approximately +450 mmHg), the relief valve means 50 is opened.

The mechanical supercharger 15 and the relief valve means 50 are controlled by means of an electronic control unit (ECU) in the same way as described in the previous embodiment. When the engine EL operates in the low engine speed, low engine load range where the operating engine speed is lower than the critical engine speed and the intake air pressure is lower than the lower critical pressure P1, the mechanical supercharger 15 stops and the relief valve means 50 is opened. In this state or condition, the mechanical supercharger 15, although stops, discharges and supplies intake air into the intake collecting pipe 136 to some extent through the intercooler 117 and the intake resonance pipe 137, by the aid of a pressure difference of intake air occurred between upstream and downstream of the supercharger 15; and the relief valve means 50 allows intake air to be supplied into the intake collecting pipe 136 from the downstream end of the intake collecting pipe 136 through the bypass pipe 27. Thus, the intake air can be sufficiently and nearly equally distributed and supplied among the intake port 103a-103d for the cylinder 102a-102d so as to equalize the volumetric efficiencies among the cylinders 102a-102d, accordingly.

In the high engine load range where the intake air pressure is higher than the upper critical pressure substantially over the whole range of operating engine speed, the mechanical supercharger 15 operates to discharge and supply a great amount of pressurized intake air into the intake collecting pipe 136 from the upstream parts thereof passing the intercooler 17, and a surplus of intake air supplied into the intake collecting pipe 136 returns into the upstream pipe part of the intake pipe 16 passing through the bypass pipe 27 with the open relief valve means 50. Thus, part of the intake air can be circulated through the intake system by means of the mechanical supercharger 15, whereby volumetric efficiencies between the No. 1 through No. 4 cylinders 102a-102d are equalized so as to prevent knocking of the engine EL and the resonance effect can be obtained at the frequency of natural oscillation of resonance air column formed by the pressure reflecting portion 17a of the intercooler 17.

Figure 19:
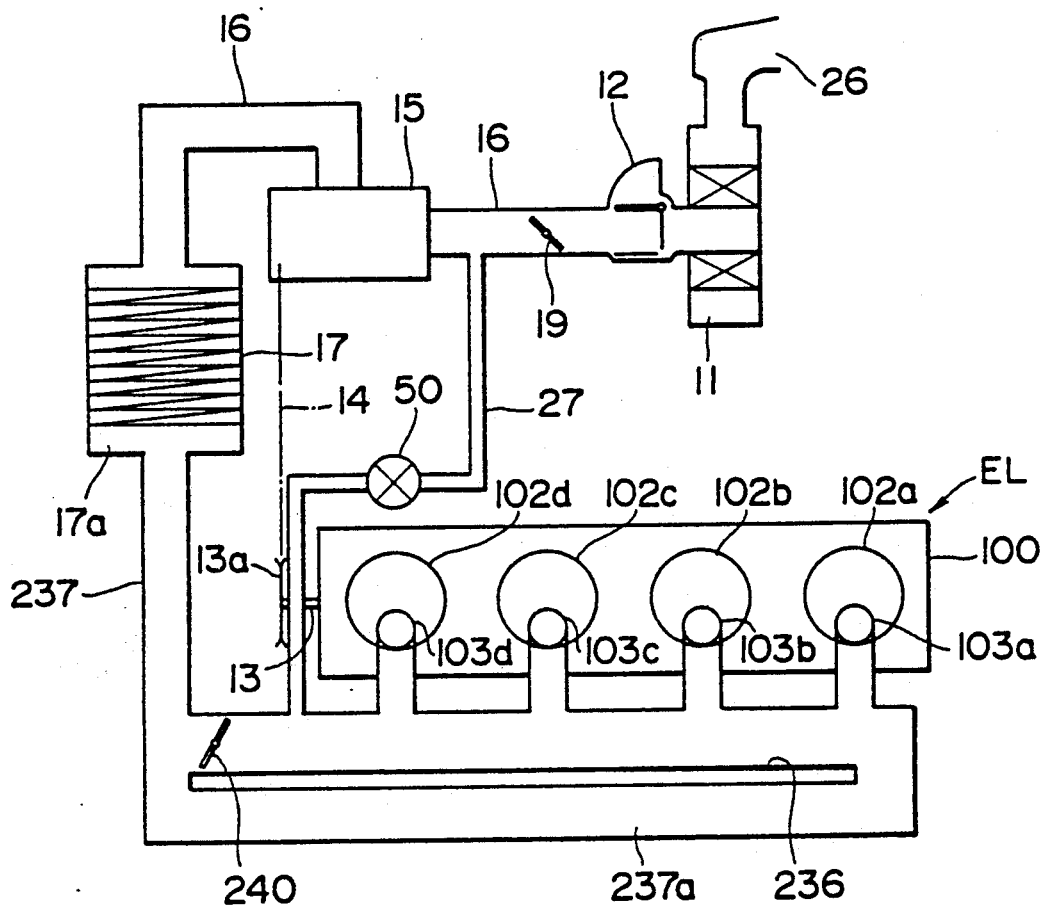
FIG. 19 is a schematic, diagrammatical view showing the in-line four cylinder internal combustion engine with an intake system in accordance to with another preferred embodiment of the present invention.
Figure 20:
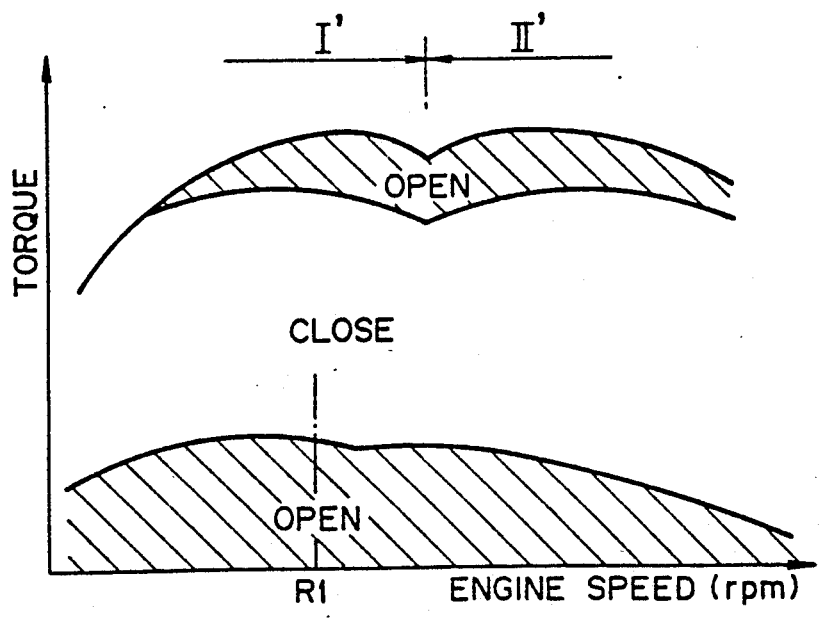
FIG. 20 is a graph showing the relationship between engine speed and engine power output for the engine shown in FIG. 19.

Referring to FIGS. 19 and 20 showing an intake system in accordance with another preferred embodiment of the present invention embodied in the in-line four cylinder engine EL, which is similar to that shown in FIG. 18 with exception that the frequency of natural oscillation of resonance air column is changed correspondingly to operating engine speeds.

An intake resonance pipe 237, which is connected at its upstream end to the pressure reflecting portion 17a of the intercooler 17, has an intake resonance pipe extension 237a formed integrally with the intake resonance pipe 237 and extending bypassing the in-line four cylinder engine body 100 of the engine EL. An intake collecting pipe 236 is integrally formed with the intake resonance pipe 237 and the intake resonance pipe extension 237a, and folded back extending in parallel to the intake resonance pipe extension 237a from the downstream end to the upstream end of the intake resonance pipe extension 237a. The downstream end of the intake collecting pipe 236 is communicated with the intake resonance pipe 237. The intake collecting pipe 236 is provided with a switch valve 240 disposed close to the downstream end thereof.

The intake ports 103a to 103d for the No. 1, No. 2, No. 3 and No. 4 cylinders 102a to 102d are separately communicated with the folded-back pipe part 236a of the intake resonance pipe 236 by way of the discrete intake pipes 135a to 135d, respectively.

The bypass pipe 27 with the relief valve means 50 disposed therein is connected to the intake collecting intake pipe 236 at a position between the switch valve 240 and the discrete intake pipe 135a communicating the intake port 103d for the No. 4 or most downstream located cylinder 102d. The relief valve means 50 and the mechanical supercharger 15 are controlled by an electronic control unit (not shown) similar to the ECU 70 shown in FIG. 2 or 13. That is, the relief valve means 50 is opened, when the engine operates in low engine load range where the pressure of intake air pressure in the intake pipe 16 downstream the supercharger 15 is lower than the lower critical pressure P1 (for example approximately −100 mmHg) or in high engine load range where the pressure of intake air in the intake pipe 16 downstream the supercharger 15 is higher than an upper critical pressure P2 (for example approximately +450 mmHg). The mechanical supercharger 15 is off when the operating engine speed is lower than a predetermined or preselected critical speed R1 (for example approximately 3000 r.p.m.). The switch valve 240 is also controlled by the electric control unit to close in low engine speed range I' but to open in high engine speed range II'.

In the low engine speed, low engine load range where the operating engine speed is lower than the critical engine speed (approximately 3000 r.p.m.) and the intake air pressure the downstream side of the supercharger 15 is lower than the lower critical pressure (approximately −100 mmHg), the switch valve 240 is closed but the relief valve 50 is opened while the mechanical supercharger 15 stops or turns off, whereby the intake air is, on one hand, discharged from the mechanical supercharger 15 due to the pressure difference of intake air caused between the upstream and the downstream of the mechanical supercharger 15 into the collective intake pipe 236 from the upstream end toward the downstream end passing through the intake resonance pipe extension 237a and, on the other hand, is introduced into the intake collecting pipe 236 from its downstream pipe part passing through the bypass pipe 27 while the relief valve means 50 is left open.

In the low engine speed, high engine load range where the mechanical supercharger 15 is turned on while the switch valve means 240 is maintained closed but the relief valve means 50 is maintained open, a circular passage running through the intake pipe 16, the supercharger 15, the intercooler 17, the intake resonance pipes 237 and 237a and the intake collecting pipe 236 is formed to circulate intake air. Therefore, the intake air is forced into the intake collecting pipe 236 from the downstream end toward the upstream end passing the intake resonance pipe extension 237a; and a surplus of the intake air supplied to the intake collecting pipe 236 is forced out into the circular passage. In the state that the switch valve 240 is closed, an extremely long resonance air column is formed so as to contribute to or enhance the supercharging effect in the low engine speed range.

In the high engine speed, high engine load range where both of the relief valve means 50 and the switch valve means 240 are opened and the mechanical supercharger 15 is turned on, the intake air is forced into the intake collecting pipe 236 not only from the upstream end through the intake resonance pipe extension 237a but also from the downstream end directly through the intake resonance pipe 237; and a surplus of the intake air in the intake collecting pipe 236 is forced out into the circular passage. In the state or condition that the switch valve means 240 is opened, a short resonance air column is formed so as to contribute to or enhance the supercharging effect in the low high speed range.

Figure 21:
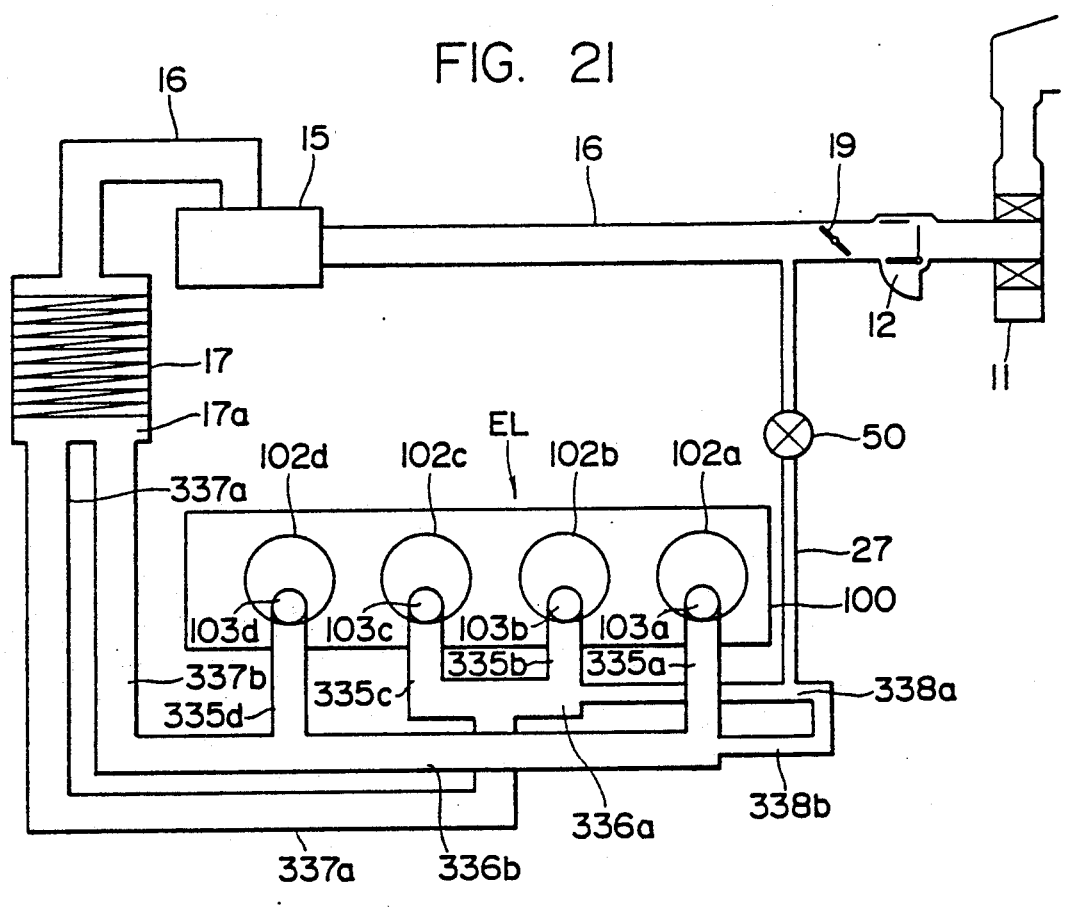
FIG. 21 is a schematic, diagrammatical view showing the in-line four cylinder internal combustion engine with an intake system in accordance to with another preferred embodiment of the present invention.

Referring now to FIG. 21 showing an intake system in accordance with still another preferred embodiment of the present invention embodied the in-line four cylinder engine EL in which a considerably enhanced supercharge effect can be obtained. A particular feature of this embodiment resides in the provision of an intake collecting pipe divided into two parts.

Intake air is introduced into the cylinders 102a to 102d through the intake passage 16, first and second branch intake resonance pipes 337a and 337b branching off from the pressure reflection portion 17a of the intercooler 17 and first and second branch intake collecting pipes 336a and 336b. The first and second branch intake collecting pipes 336a and 336b are communicated at their downstream ends with each other by way of first and second branch bypass pipes 338a and 338b branching off from the downstream end of the bypass pipe 27. The bypass pipe 27, which is provided with the relief valve means 50, is connected to the middle portion of the upstream pipe part of the intake pipe 16.

The intake ports 103b and 103c for the No. 2 and No. 3 cylinders 102b and 102c are separately communicated with the first intake collecting pipe 336a by way of the discrete intake pipes 135b and 135c, respectively. Similarly, the intake ports 103a and 103d for the No. 1 and No. 4 cylinders 102a and 102d are separately communicated with the second intake collecting pipe 336b by way of the discrete intake pipes 135a and 135d, respectively.

It is similar to any previous embodiment that the mechanical supercharger 15 is disposed between the upstream pipe part and downstream pipe part of the intake pipe 16 and the intercooler 17 is disposed between the downstream pipe part of the intake pipe 16 and the intake resonance pipes 337a and 337b.

Figure 22:
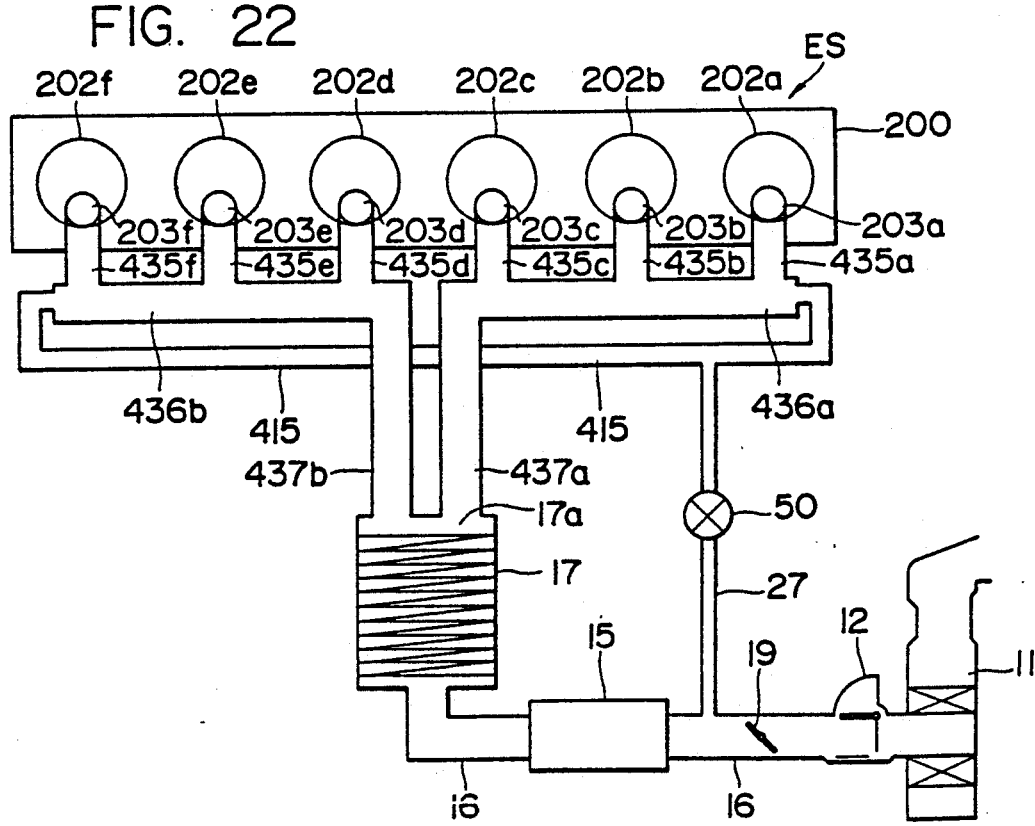
FIG. 22 is a schematic, diagrammatical view showing an in-line six cylinder internal combustion engine with an intake system in accordance to with a preferred embodiment of the present invention.

Owing to dividing the cylinders 102a to 102d into two groups by the provision of the first and second branch intake collecting pipes 336a and 336b and the first and second branch intake resonance pipes 337a and 337b connected to the the first and second branch intake collecting pipes 336a and 336b, respectively, the pressure waves having large amplituds can be propagated in the intake resonance pipe 337a or 337b and reflected by the pressure reflecting portion 17a of the intercooler 17, whereby resonance effect is greatly enhanced Referring now to FIG. 22, an engine body 200 of an in-line six cylinder engine ES having an intake system according to a preferred embodiment of the present invention is shown, being formed with No. 1 to No. 6 cylinders 202a to 202f arranged one after the other in numerical order in a straight line. The No. 1 cylinder 202a, the No. 5 cylinder 202e, the No. 3 cylinder 202c, the No. 6 cylinder 202f, the No. 2 cylinder 202b and the No. 4 cylinder 202d are fired in order. The cylinders 202a to 203f are divided into two groups and the cylinders in each group are associated with one and the same intake collecting pipe 436a or 436b, respectively. The cylinders 402a to 402f are, respectively, provided with intake ports 403a to 403f. Further, the cylinder 402a to 402f are, respectively, provided with exhaust ports (not shown).

Intake air is introduced into the cylinders 202a to 202f through the intake pipe 16, first and second branch intake resonance pipe 437a and 437b connected to the pressure reflection portion 17a of the intercooler 17.

The intake ports 203a to 203c for the No. 1 to No. 3 cylinders 202a to 202c are separately communicated with the first intake collecting pipe 436a from the downstream end of the first intake collecting pipe 436a by way of discrete intake pipes 435a to 435c which are relatively short in length. Similarly, the intake ports 203d to 203f for the No. 4 to No. 6 cylinders 202d to 202f are separately communicated with the second intake collecting pipe 436b from the upstream end of the second intake collecting pipe 436b by way of discrete intake pipes 435d to 435f which are relatively short in length.

The downstream ends of the first and second intake collecting pipes 436A and 436B are communicated with each other by way of a downstream extension pipe 415 having an inner diameter smaller than that of each branch intake resonance pipe 336A or 336B. The bypass pipe 27, which is provided with the relief valve means 50, is connected to the middle portion of the downstream extension pipe 415.

It is similar to any previous embodiment that the mechanical supercharger 15 is disposed between the upstream and downstream pipe parts of the intake pipe 16 and the intercooler 17 is disposed between the downstream pipe part of the intake pipe 16 and the intake resonance pipes 437a and 437b.

It is to be understood that whereas the invention has been described in detail with reference to preferred embodiments, nevertheless, various other embodiments and variants are possible which are within the spirit and scope of the invention, and such embodiments and variants are intended to be covered by the following claims.

What is claimed is:

1. An intake system for an internal combustion engine comprising:
    an engine having an engine body which includes a plurality of cylinders, and intake ports provided for said cylinders, respectively;
    an intake passage with throttle valve means disposed therein for introducing air into said intake system;
    supercharger means disposed between upstream and downstream pipe parts of said intake passage for feeding supercharged air to said cylinders;
    an intake collecting passage for receiving supercharged air from said supercharger means and feeding same as intake air to said cylinders, respectively;
    a plurality of independent intake passages separately coupling said intake collecting passage to said intake ports for said cylinders; and
    a bypass passage for allowing a passage of intake air from said intake passage to said intake collecting passage to bypass said supercharger means, said bypass passage being connected to said intake passage to said intake collecting passage at a position downstream the most upstream positioned independent intake passage.

2. An intake system as defined in claim 1, wherein said bypass passage is connected to said upstream pipe part of said intake passage between said supercharger means and said throttle valve means.

3. An intake system as defined in claim 2, wherein said bypass passage is connected to said intake collecting passage at a position downstream the most downstream positioned one of said independent intake passages.

4. An intake system as defined in claim 3, wherein said intake collecting passage supplies intake air among said intake ports for said cylinders which are not intended to fire one after another and said intake collecting passage is formed as an intake resonance passage without an enlarged volume chamber which damps pressure waves.

5. An intake system as defined in claim 4, wherein said engine is a V-type engine having first and second banks, each bank including one group of said cylinders not intended to fire one after another and said intake collecting passage is provided for each said bank.

6. An intake system as defined in claim 5, wherein said intake collecting passages are formed as an intake resonance passage without an enlarged volume chamber which damps pressure waves and are integarally provided with downstream passage extensions communicated with each other at their downstream ends, and said bypass passage is connected to said downstream passage extensions.

7. An intake system as defined in claim 6, further comprising switch valve means disposed in each said downstream passage extension and positioned downstream a position where said bypass passage is connected to said downstream passage extensions, said switch valve means being opened in high engine speed range.

8. An intake system as defined in claim 2, wherein said bypass passage is connected to said intake collecting passage at a position between said the most upstream and downstream independent intake passages.

9. An intake system as defined in claim 2, wherein said intake collecting passage supplies intake air among said intake ports for said cylinders which are not intended to fire one after another and said intake collecting passage is formed as an intake resonance passage without an enlarged volume chamber which damps pressure waves.

10. An intake system as defined in claim 2, wherein said bypass passage is provided with relief valve means adapted to open or close according to an engine operating condition.

11. An intake system as defined in claim 10, wherein said relief valve means is opened at least in a high engine load range to relieve intake air from said intake collecting passage into said intake pipe upstream said supercharger.

12. An intake system as defined in claim 10, wherein said supercharger means includes supercharger disabling means for disabling said supercharger means in a low engine load range, and said relief valve means is opened in said low engine load range to supply intake air from said intake pipe into said intake collecting passage.

13. An intake, system as defined in claim 12, wherein said supercharger disabling means consists of an on-off clutch by which an engine output transmitted from a crankshaft is connected to or cut off from said supercharger means.

14. An intake system as defined in claim 2, wherein said intake collecting passage is looped by way of an intake resonance passage provided at its downstream end with switch valve means, said switch valve means being closed in low engine speed range or opened in high engine speed range, and said bypass passage is connected to said resonance passage between said switch valve means and the most downstream positioned one of said independent intake passages.

15. An intake system for an internal combustion engine comprising;
    an engine having an engine body formed with first to sixth cylinders divided into two groups and intake ports formed for said first to sixth cylinders, respectively, said cylinders in each said group being not intended to fire one after the other;
    supercharger means disposed in an intake passage having a throttle valve disposed upstream said supercharger means for feeding supercharged air to said cylinders;
    an intake collecting passage provided for each said group of cylinders for receiving supercharged air from said supercharger means and feeding same as intake air to said engine body;
    a plurality of independent intake passages separately coupling said intake collecting passage with said intake ports for each said group of cylinders, respectively;
    a communication passage connected to said intake collecting passages at positions downstream the most upstream located independent intake passage, respectively, so as to communicate said intake collecting passages with each other; and a bypass passage forming a bypass for allowing a passage of intake air from said intake passage into said intake collecting passages to bypass said supercharger means, said bypass passage having branch bypass passage parts independently connected to said intake collecting passages.

16. An intake system as defined in claim 15, wherein said communication passage is provided with switch valve means and said bypass passage is connected to said intake passages at positions upstream said switch valve means, said switch valve means is closed in low engine speed range or opened in high engine speed range.

17. An intake system as defined in claim 15, wherein said bypass passage is provided with relief valve means common to said intake collecting passages for allowing the passage of intake air from said intake passage to said intake collecting passages in specific engine operating conditions.

18. An intake system as defined in claim 15, wherein each said branch bypass passage part of said bypass passage is provided with relief valve means for allowing the passage of intake air from said intake passage to said intake collecting passages in specific engine operating conditions.

19. An intake system for a V-type multi-cylinder internal combustion engine comprising:

an engine having first and second banks each of which includes a plurality of cylinders not intended to fire one after another, and intake ports provided for said cylinders, respectively;

supercharger means disposed in an intake passage having a throttle valve disposed upstream said supercharger means for feeding supercharged air to said cylinders;

first and second intake collecting passages for receiving supercharged air from said supercharger means and feeding same as intake air to said first and second banks, respectively;

a first branch intake passage coupling said first intake collecting passage with intercooler means;

a second branch intake passage coupling said second intake collecting passage with said intercooler means;

a plurality of first independent intake passages coupling said first intake collecting passage with said intake ports of said cylinders constituting said first bank;

a plurality of second independent intake passages coupling said second intake collecting passage with said intake ports of said cylinders constituting said second bank;

a communication passage connected to said first and second intake collecting passages at positions between the most upstream and downstream located independent intake passages, respectively, so as to communicate said intake collecting passages with each other; and a bypass passage forming a bypass for allowing intake air from said intake passage into said first and second intake collecting passages to bypass said supercharger means, said bypass passage being connected to each said intake collecting passage at a position between the most upstream and downstream located independent intake passages and to said intake passage at a position between said supercharging means and said throttle valve means.

* * * * *